Oct. 31, 1933.   N. A. LAURY   1,932,413
PROCESS OF MANGANESE ORE TREATMENT
Filed July 29, 1925
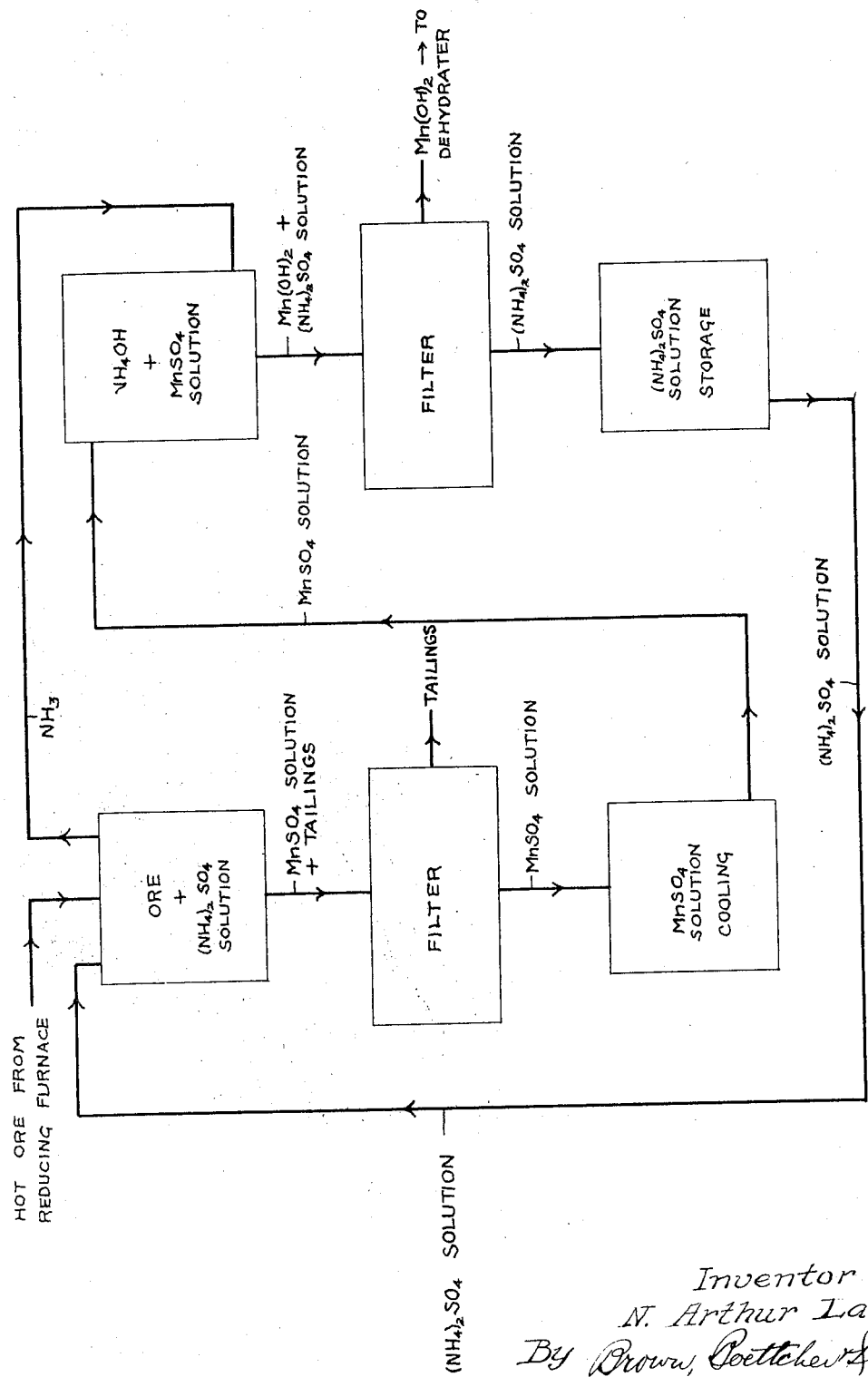
Inventor
N. Arthur Laury
By Brown, Boettcher & Dienner
Attorneys.

Patented Oct. 31, 1933

1,932,413

UNITED STATES PATENT OFFICE 1,932,413

PROCESS OF MANGANESE ORE TREATMENT

Napoleon Arthur Laury, Rockville Center, N. Y., assignor, by mesne assignments, to Howard B. Bishop, Summit, N. J.

Application July 29, 1925. Serial No. 46,739

10 Claims. (Cl. 23—145)

My invention relates to the recovery of manganese compounds from manganese bearing ores and its primary object is to provide a process whereby such compounds may be efficiently produced from low grade manganese bearing ores containing say less than twenty per centum of manganese, of which large deposits exist, as well as from higher grade manganese bearing ores.

Having actually carried out the new process of my invention, I am enabled to set it forth in this specification in considerable detail, and I do so in order to teach those skilled in the art fully in its use, but I desire that it shall be understood that details, though important and made the subject matter of the more limited of the appended claims, may be varied and that the broader scope of my invention is to be measured by the broader of the appended claims.

Manganese exists in the ores with which I am concerned, principally in its higher oxides, such as manganese dioxide, and my process is accordingly accommodated to that fact, but it is important that my process is effective in the treatment of ores which contain manganese as carbonates.

At the outset I grind the crude ore to finely divided form (I have gone as far as two hundred mesh), and then heat it in a reducing furnace to over six hundred degrees Centigrade for several hours in the presence of a reducing agent, in excess, in the form of a gas, such as hydrogen, carbon monoxide, or illuminating gas, or in solid form, such as free carbon or coal, mixed with it. The purpose of this reduction is to bring the manganese compound down to manganese monoxide; and as an example of the excess of reducing agent required, I point out that, for instance, where three and eight-tenths per centum of carbon is theoretically required for the reduction, five per centum is sufficient.

Reduction of the dioxide by hydrogen is as follows:—

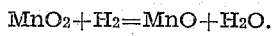

$$MnO_2 + H_2 = MnO + H_2O.$$

The manganese in the ore having been reduced to the monoxide, as just described, it is important that the ore be cooled out of contact with the air to prevent re-oxidization, and this may be effectively accomplished by immediately quenching the hot ore in water or, indeed, in the leaching solution which is the reagent in the next step.

The leaching process is based upon the fact that manganous oxide obtained as above described can be brought into solution by the action of a suitable ammonium salt, the acid-radical of which forms a soluble salt with the manganous oxide by double decomposition, such for example, as the chloride or sulphate. The double decomposition also forms ammonia, which ordinarily would be expected to precipitate manganous hydroxide from the solution. However, it is well known that some metals, including manganese, are not precipitated as hydroxide by ammonia when ammonium salts are also present. Physical chemistry attributes this face to the repression of the ionization of the ammonia to such a degree that the hydroxyl ions are not sufficiently concentrated to precipitate the manganese as the hydroxide. Under these conditions the ammonia exists in the solution merely as dissolved ammonium hydroxide and it is quite ineffective upon the dissolved manganous salts. In order to reduce the amount of ammonium salts required to hold the manganese in solution against precipitation by ammonia, the reaction of the ammonium salts on the manganous oxide is carried out under conditions favorable to decreasing the alkalinity. By this procedure the manganous oxide may be rendered soluble without danger of subsequent precipitation by the ammonia formed during the process of rendering the manganous oxide soluble. The preferred manner of carrying out the leaching process so as to reduce the alkalinity is to remove the ammonia by conducting the process at a temperature ensuring the escape of ammonia from the solution. The preferred leaching solution is ammonium sulphate and the process is hereinafter described as carried out by the use of ammonium sulphate.

The leaching solution is one of an ammonia salt, such as ammonium sulphate or ammonium chloride, and I shall use ammonium sulphate as a specific example.

Although the other oxides of manganese and its carbonates are not soluble in the ammonium sulphate solution, manganese monoxide is, and the reduced ore is introduced to this leaching reagent and goes into solution, as follows:—

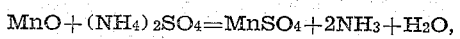

$$MnO + (NH_4)_2SO_4 = MnSO_4 + 2NH_3 + H_2O,$$

leaving behind the remainder of the ore, which is insoluble, except some possible soluble impurities which, I have found, are negligible both in character and quantity.

The strength of the leaching solution is important, since there must be sufficient solution to insure the dissolving of all the manganese salt, manganous sulphate in this case, in which a fifteen per centum solution of ammonium sulphate is preferably employed. The leaching is preferably aided by heat to a temperature of approximately eighty degrees centigrade, requiring several hours without, and a lesser time with, agitation. It is also preferable that the leaching be so conducted and controlled as to exhaust substantially all the ammonium sulphate in the solution, leaving only manganous sulphate dissolved, since a considerable amount of ammonium sulphate remaining in the solution at the end of the leaching operation interferes with the further procedure in the process. It may be desirable to leach the ore in two stages, i. e., fresh ammonium sulphate solution may be used to treat partially leached ore (which may be finely ground) and partly converted solution may be used to treat fresh ore (which may be coarsely ground).

From the foregoing it will be apparent that it is the escape of ammonia from the leaching operation that permits substantially all the ammonium salts to be changed to manganous salts. There being substantially little ammonium hydroxide left in the solution, there is required no free ammonium salts to hold the manganous salt in solution against precipitation by the ammonia.

In the above leaching reaction, as will be noted, ammonia gas is given off and it is preferably recovered for further use in the process, as follows:—

The manganous sulphate solution is then separated from the insoluble remainder of the ore by filtering and is cooled, and, in cool condition, is treated with ammonia, resulting in the precipitation of manganous hydroxide and the restoration of ammonium sulphate solution. The ammonia released and recovered during the leaching operation may be passed directly to a cooling tower to meet, in counter current, the clear cool manganous sulphate solution, or it may be used to form aqueous ammonia which may then be added cool to the cool manganous sulphate solution. Aqueous ammonia testing approximately twenty-six degrees Baumé is satisfactory for this purpose, the ammonia solution being added to the other with stirring until pink to phenol phthalein. The reaction is as follows:—

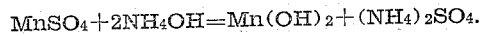
$$MnSO_4 + 2NH_4OH = Mn(OH)_2 + (NH_4)_2SO_4.$$

The precipitated manganous hydroxide, which is white, is then separated from the ammonium sulphate solution, by filtering or decanting, preferably protected from the atmosphere, and is then subjected to heat to a temperature of say up to about eight hundred and twenty five degrees centigrade whereby it is dehydrated to substantially pure manganese monoxide, commercially a highly desirable form of manganese, as follows:—

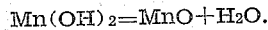
$$Mn(OH)_2 = MnO + H_2O.$$

The dehydration, and subsequent cooling, is preferably done in a reducing atmosphere.

As stated in the foregoing the presence of ammonium salts may prevent the complete precipitation of manganous hydroxide by ammonia. The above reaction shows that such precipitation adds ammonium sulphate to the solution, or increases the amount thereof so that it tends to prevent complete precipitation of the manganese recovered in the leaching process. This is immaterial, however, because the solution is not discarded but is used over again for another leaching process, and any manganese which may be retained therein is subject to precipitation in the next cycle.

The use of the liberated ammonia and the restoration of the ammonium sulphate solution, as above pointed out, makes the process of my invention regenerative and continuous, as will be evident from the accompanying drawing. The drawing is purely diagrammatic and is fully supplied with nomenclature so that it speaks for itself.

The tailings from the filter which separates the manganous sulphate solution from the insoluble remains of the ore comprise, primarily, silica and iron as an oxide which is in magnetic form and may be concentrated for commercial purposes as a by-product.

I claim:

1. The process of recovering a manganese compound from material containing manganous oxide, which comprises leaching the material with a solution of an ammonium salt capable of forming a soluble manganous salt, simultaneously removing the resulting ammonia from the leaching liquor, and then precipitating a manganese compound from said solution by means of ammonia.

2. A cylic regenerative process for recovering a manganese compound from material containing manganous oxide which comprises, treating the material with a solution of an ammonium salt of an acid of which the manganous salt is soluble, simultaneously releasing the resulting ammonia from solution, conserving the ammonia, separating the manganese salt solution from the insolubles, precipitating manganese hydroxide from said solution by the conserved ammonia whereby to form regenerated ammonium salt, separating the hydroxide from the ammonium salt solution, and conserving the ammonium salt solution for subsequent leaching operations.

3. The process of recovering a manganese compound from material containing manganous oxide, which comprises leaching the material with a solution of an ammonium salt capable of forming a soluble manganous salt, simultaneously treating the leaching liquor to release ammonia, and then precipitating a manganese compound from said solution by means of the ammonia released in said leaching operation.

4. The process of recovering a manganese compound from material containing manganous oxide, which comprises leaching the material with a solution of an ammonium salt capable of forming therewith a soluble manganous salt, simultaneously treating the solution to remove the resulting ammonia, then treating said manganous salt solution with ammonia to precipitate a manganese compound and form a solution of said ammonium salt, and leaching fresh ore with said solution of said ammonium salt thus formed.

5. The process of recovering manganese from ores, which comprises leaching a charge containing manganese monoxide with a solution of a salt of ammonia with an acid of which the manganous salt is soluble under the influence of heat whereby simultaneously to form a solution of a manganese salt and to release ammonia, and then cooling said solution and precipitating the manganese therefrom.

6. The process of recovering manganese from ores, which comprises leaching a charge containing manganese monoxide with a solution of a salt of ammonia with an acid of which the manganous salt is soluble under the influence of heat to a temperature of eighty degrees centigrade whereby simultaneously to form a solution of a manganese salt and to release ammonia, and then cooling said solution and precipitating the manganese therefrom.

7. The process of recovering manganese monoxide, which comprises grinding a manganese bearing ore to a finely divided state, heating the same in the presence of a reducing agent to reduce its manganese content to manganese monoxide, leaching the ore thus reduced with a solution of an ammonium salt capable of interaction with the manganous oxide to form a manganous salt under the influence of heat whereby simultaneously to form a manganese salt solution and to release ammonia, recovering said ammonia, separating said manganese salt solution from the insolubles, cooling said manganese salt solution and treating the same under cool conditions with the ammonia thus recovered to precipitate manganous hydroxide and form a solution of said ammonium salt, separating said manganous hydroxide from said solution of said ammonium salt, and leaching fresh reduced ore with said final solution of ammonium salt.

8. The process of recovering a manganese compound from material containing manganous oxide which comprises leaching the material with a solution of an ammonium salt capable of forming a soluble manganous salt, simultaneously removing the resulting ammonia from the leaching liquor, and then precipitating a manganese compound from said solution by means of said ammonia.

9. The process of recovering a manganese compound from material containing manganous oxide, which comprises leaching the material with a solution of an ammonium salt capable of forming therewith a soluble manganous salt, simultaneously treating the solution to remove the resulting ammonia, then treating said manganous salt solution with said ammonia to precipitate a manganese compound and form a solution of said ammonium salt, and leaching fresh reduced ore with said solution of said ammonium salt thus formed.

10. The process of recovering manganese monoxide which comprises leaching a charge containing the same with an ammonium sulphate solution under conditions simultaneously to form a manganous sulphate solution and to release ammonia, treating said manganous sulphate solution with said ammonia to form manganous hydroxide and ammonium sulphate solution, and then separating out said manganous hydroxide and dehydrating it to manganese monoxide.

N. ARTHUR LAURY.